UNITED STATES PATENT OFFICE.

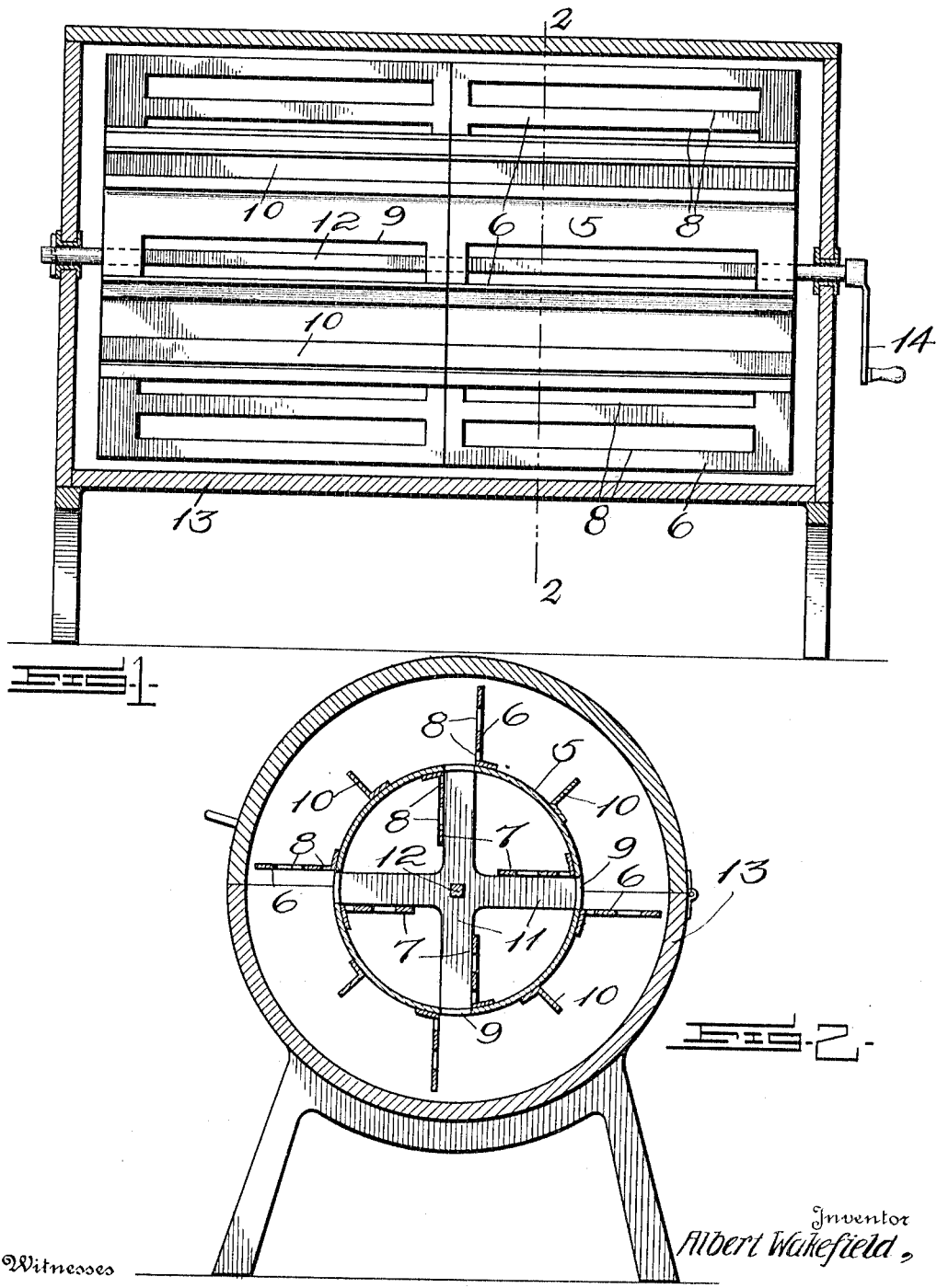

ALBERT WAKEFIELD, OF WASHINGTON, DISTRICT OF COLUMBIA.

CHURN.

1,116,177.  Specification of Letters Patent.  Patented Nov. 3, 1914.

Application filed July 22, 1914. Serial No. 852,524.

*To all whom it may concern:*

Be it known that I, ALBERT WAKEFIELD, a citizen of the United States, residing at Washington, in the District of Columbia, have invented certain new and useful Improvements in Churns, of which the following is a specification.

This invention relates to churns, and more particularly to the dasher, its object being to provide a novel and improved form of dasher which enables the churning to be easily and quickly done. Although designed more particularly for a churn dasher, the dasher may also be employed in connection with mixing apparatus.

In order that the invention may be better understood, reference is had to the accompanying drawing, in which—

Figure 1 is an elevation of the dasher, the churn body or receptacle being shown in section, and Fig. 2 is a cross-section on the line 2—2 of Fig. 1.

Referring specifically to the drawing, the dasher is a hollow, rotary cylinder 5 armed with radially extending dasher blades 6 and 7 located, respectively, on the outside and on the inside of the cylinder. Several dashers, arranged in horizontal relation may be used in combination, if desired. The blades extend lengthwise of the cylinder, parallel to the axis thereof, and each blade has longitudinal slots 8 to permit the milk and cream to pass. Alongside of each set of inner and outer blades, the cylinder has a longitudinal slot or opening 9, whereby the prevention of the accumulation of butter or other separated product within the cylinder is facilitated. Between these slots the cylinder is armed with longitudinal ribs 10, located on the outside of the cylinder, parallel to the blades 6, and alternating therewith.

The cylinder 5 is open at its ends and has thereat spiders 11 through the center of which a shaft 12 passes. This shaft is squared so that the cylinder may rotate therewith. Any other suitable provision may be made for mounting the cylinder on the shaft so as to rotate therewith.

The dasher hereinbefore described is mounted in a suitable receptacle 13 in which the milk to be churned is placed. At the ends of the receptacle are bearings for the dasher shaft 12, one end of said shaft extending from the corresponding end of the receptacle and being provided with a crank-handle or other suitable operating means 14.

As the blades of the dasher are located on the outside as well as on the inside of the cylinder, a large volume of milk is subjected to the action of the blades, and the milk is thoroughly agitated so that butter quickly forms.

I claim:

1. A dasher comprising a hollow rotary cylinder having openings, and radial blades mounted on the inside and on the outside of said cylinder.

2. A dasher comprising a hollow rotary cylinder having longitudinal slots, and radial blades mounted on the cylinder alongside said slots, said blades being located on the inside and on the outside of the cylinder.

3. A dasher comprising a hollow rotary cylinder having openings, alternating radial blades and ribs mounted on the outside of the cylinder, said blades having openings, and radial blades on the inside of the cylinder.

4. A dasher comprising a hollow rotary cylinder having longitudinal slots, and slotted radial blades mounted on the cylinder alongside said slots, said blades being located on the inside and on the outside of the cylinder.

5. A dasher comprising a hollow rotary cylinder having longitudinal slots, slotted radial blades mounted on the cylinder alongside said slots, said blades being located on the inside and on the outside of the cylinder, and ribs mounted on the outside of the cylinder and alternating with the blades thereof.

In testimony whereof I affix my signature in presence of two witnesses.

ALBERT ╳ WAKEFIELD.
<span style="margin-left:4em">his</span>
<span style="margin-left:7em">mark</span>

Witnesses:
EMILY F. CAMP,
MARGERY C. LUCAS.

Copies of this patent may be obtained for five cents each, by addressing the "Commissioner of Patents, Washington, D. C."